United States Patent
Zhai et al.

[11] Patent Number: 5,923,318
[45] Date of Patent: Jul. 13, 1999

[54] FINGER MANIPULATABLE 6 DEGREE-OF-FREEDOM INPUT DEVICE

[76] Inventors: Shumin Zhai, 30 Charles Street West, Apt. #1705, Toronto, Ontario, Canada, M4Y 1R5; Paul Milgram, 362 Palmerston Blvd., Toronto, Ontario, Canada, M6G 2N6

[21] Appl. No.: 08/631,373

[22] Filed: Apr. 12, 1996

[51] Int. Cl.⁶ .................................................. G09G 5/08
[52] U.S. Cl. ........................ 345/157; 345/156; 345/158
[58] Field of Search ................................ 345/156, 157, 345/158, 163, 167; 74/741 XY; 273/148 B; 178/18, 19

[56] References Cited

U.S. PATENT DOCUMENTS

| | | | |
|---|---|---|---|
| 473,499 | 4/1892 | Delano | 200/505 |
| 1,911,444 | 5/1933 | Fator | 200/505 |
| 3,463,990 | 8/1969 | Ross | 200/505 |
| 4,736,640 | 4/1988 | Hooks | 73/866.1 |
| 4,754,268 | 6/1988 | Mori | 345/163 |
| 4,839,838 | 6/1989 | LaBiche et al. | 345/157 |
| 4,862,165 | 8/1989 | Gart | 345/163 |
| 4,977,397 | 12/1990 | Kuo et al. | 345/163 |
| 4,988,981 | 1/1991 | Zimmerman et al. | 345/157 |
| 5,006,836 | 4/1991 | Cooper | 345/163 |
| 5,122,785 | 6/1992 | Cooper | 345/163 |
| 5,168,221 | 12/1992 | Houston | 345/167 |
| 5,262,777 | 11/1993 | Low et al. | 345/157 |
| 5,287,089 | 2/1994 | Parsons | 345/157 |
| 5,296,871 | 3/1994 | Paley | 345/157 |
| 5,355,147 | 10/1994 | Lear | 345/156 |
| 5,363,120 | 11/1994 | Drumm | 345/158 |
| 5,453,759 | 9/1995 | Seebach | 345/158 |
| 5,457,480 | 10/1995 | White | 345/163 |
| 5,541,621 | 7/1996 | Nmngani | 345/167 |

FOREIGN PATENT DOCUMENTS

WO9308540  4/1993  WIPO .

*Primary Examiner*—Matthew Luu
*Attorney, Agent, or Firm*—Lynn C. Schumacher; Hill & Schumacher; Dowell & Dowell, P.C.

[57] ABSTRACT

The present invention provides an isotonic six degree-of-freedom input device to be grasped by a user's fingers and manipulated by both fingers, wrist and upper limb. The device includes a housing having a shape and dimension effective to permit a user to grasp and manipulate the housing using the fingers of his hand. In one embodiment the housing encloses an interior cavity adapted to contain a position sensor. The entire housing is a pressure sensitive switch which is activated by the user squeezing the housing with his fingers and/or thumb from any position on the outer surface of the housing. In a preferred embodiment the input control device is spherical in shape and has a textured outer surface adapted to prevent slippage in the user's fingers. In addition to the large muscle groups of the shoulders, arm and hand, the input device makes extensive use of the small muscle groups of the fingers and thumb.

16 Claims, 4 Drawing Sheets

FINGER MANIPULATABLE 6 DEGREE-OF-FREEDOM INPUT DEVICE

FIELD OF THE INVENTION

The present invention relates to a 6 degree-of-freedom control device used in human-machine interactive applications, such as computer input devices, robot controllers, machine controllers and the like. More particularly, the present invention relates to an input device operated by the entire upper and lower arm, including the hand and fingers.

BACKGROUND OF THE INVENTION

Various human-machine interaction areas such as telerobotics, virtual reality and scientific data visualization are all emerging as important new technologies, an important feature of which is the interactive human-machine interface. A key component of the human-machine interface in these applications is the control device or controller which allows users to manipulate 3 dimensional objects, real or virtual. These control devices are referred to as 6 degree-of-freedom (DOF) controllers because they have three translational degrees of freedom and three rotational degrees of freedom. In computer applications the control device is normally referred to as an input controller. The 6 DOF controller allows a user to manipulate 3 dimensional real or virtual objects under computer control. Typical commercial computer input devices such as the computer mouse and track ball have two degrees of freedom.

One major class of 6 DOF input devices comprises freely moving devices. This class can be further subdivided into uncoupled unsupported devices, where the user must hold his hand in the air to use it, and mechanically coupled devices, which are potentially partially supportable. Freely moving unsupported 6 DOF input devices are usually isotonic, comprising those for which the user encounters no resistive countering forces while holding and moving the device. These include the Ascension Bird™, the Logitech™ 6 D Mouse, the Flying Mouse™ and the Polhemus™. In all such devices the user holds a control handle (or wears a glove) and moves his/her hand without support. These devices usually utilize position control mapping (pure gain control) in which the user's hand motion is sensed and proportionally mapped to the position and orientation of a selected 3D object on a computer screen.

A major drawback to current unsupported isotonic position devices is their comparatively large operating volume and resultant fatiguing which arises from a user moving his/her arm about unsupported. An additional inherent limitation of these isotonic position control devices relates to the restricted operational range of translational motion due to limited arm extension length and limited rotational movement due to limited rotational range of the arm and hand. In the case of glove type unsupported isotonic 6 DOF input devices this limitation can be overcome by a system of "clutching", wherein the user clutches or declutches, in order to enable the control mechanism by means of a switching device which is activated by the hand's opening or closing. Typically, while the hand is opened the object being manipulated remains fixed and while closed it responds to the hand's movement. This procedure is completely analogous to the lifting up of a conventional 2 DOF computer mouse and replacing it elsewhere on the control surface. In the 6 DOF case, the position of the user's hand is sensed relative to a starting position, defined by the point at which the hand starts to close and activates a switch, and the distance travelled is determined and mapped onto the 3D object being controlled. In contrast to the 2 DOF case, this is not a completely satisfactory solution since it involves a set of extra hand motions, it takes up more time, and it requires potentially awkward and fatiguing translational and rotational movements of the user's unsupported limb. Designers of such systems therefore strive to minimize the frequency and extent of these control movements, primarily by means of gain control. Unfortunately, reducing this factor excessively can result in a control gain which is too high and thus too sensitive to the user's input movements.

Another class of freely moving input control devices comprises those which are somehow mechanically coupled to an external frame, rather than being unsupported. One such device is the Spidar (Masahiro Ishii and Makoto Sato, "A 3D Interface Device With Force Feedback: A Virtual Work Space For Pick-And-Place Tasks", in Proceedings of IEEE Virtual Reality Annual International Symposium" Sep. 18–22, 1993, Seattle, Wash. USA), comprising a finger harness mounted within a lattice of wires whose displacements collectively permit the sensing of 6 DOF translations and rotations, while providing force feedback through the mechanical coupling means. Another is the Immersion Probe™ (produced by Immersion Human Interface Corporation, P.O., Box 8669, Palo Alto, Calif.) comprising a stylus mounted on the end of a series of mechanical linkages. Both devices work typically in the position control mode wherein the manipulated 3D object moves in proportion to the movement of the finger harness or stylus. Due to the presence of mechanical coupling, both kinds of device have a restricted range of motion. Furthermore, even though the mechanical linkages in these devices are in principle able to provide some kind of support to the user's hand, fatiguing can still occur due to the need to move the whole hand to effect control movements.

Another major class of 6 DOF input devices are substantially isometric devices, which do not move but are sensitive to the translational and rotational forces imparted by the user. Known isometric 6 DOF controllers include the Spaceball™ (U.S. Pat. No. 4,811,608) and the Space Control Mouse (made by DFL in Germany and sold by Logitech Corporation). Isometric devices are generally used in the rate control mode so that the forces and torques applied to a control handle are converted to a velocity of the virtual or real 3D object being controlled. A major drawback to this type of controller is that the user's hand operates in a substantially stationary posture which limits the amount of somatosensory feedback experienced by the user.

Neurophysiological studies have shown that various parts of the human body are anatomically reflected in the brain disproportionately relative to their physical size and mass. Of particular interest to the inventors is the fact that representations of the fingers and the hands in both the somatosensory cortex and the motor cortex are much richer than those of the wrists, elbows and shoulders. The inventors therefore contemplate performance enhancement if fine muscle groups (i.e. fingers) are allowed to take part in handling an input device.

The inventors have studied how human performance in 6 DOF tasks vary according to the muscle groups employed. The implications of this research are that if performance for a given task is higher when a particular muscle group is employed, then input devices can be designed according to the use of that muscle group. The human upper limb as a whole (from shoulder to finger tips) has evolved to be highly dextrous and yet powerful. Every part of the upper limb has a purpose and function. The larger muscle groups that operate the wrist, elbow, and shoulder have more power and a larger range of movement than the fingers. However, the smaller muscle groups that operate the fingers and thumb have more dexterity. When all the parts work in synergy, movement range and dexterity can both be maximized. The invention disclosed here relates primarily to freely moving devices which exploit movement of all of these muscle groups.

The results of the present inventors' studies show that performance improvement in 6 DOF fine manipulation input tasks does not necessarily lie simply in moving operations from the large muscle groups to the smaller ones, but rather in using the small muscle groups in addition to the large ones. This can be achieved by permitting the user to rotate the manipulandum freely with his/her fingers. An important advantage of adding the ability to freely rotate the manipulandum with the fingers greatly reduces the frequency of situations in which the user's hand finds itself in an anatomically singular orientation. This also has the important distinct advantage of decreasing the frequency required for clutching and declutching operations.

The majority of existing designs of freely moving 6 DOF devices, such as the "Bat" (Ware, C. "Using Hand Position For Virtual Object Placement". The Visual Computer, 6, (1990), 245–253); the "Cricket" (Digital Image Design Inc. The Cricket, product information. New York, N.Y., 1993); and the 3D mouse are similar to the glove design in assigning wrist, elbow and shoulder muscles for manipulating the six degrees of freedom; however, none of these devices makes use of the fingers for 6 DOF manipulation.

The role of some kind of a button or other switching mechanism on the input device is essential for enabling communication of discrete information to the control computer. Some hand-held input devices are available having a discrete localized button, or buttons, located on the housing. A typical example of such a device is disclosed in U.S. Pat. No. 5,363,120 issued to Drumm and includes a hand held computer input device for controlling cursor movement on a display screen and is provided with several switches mounted in the housing. The limitation of this type of device is its fixed button location(s) so that users cannot freely roll the device between their fingers and thus make use of the superior dexterity of their fingers.

What is needed in input device which makes use of all parts of the associated limb, according to their respective advantages. Accordingly, it would be advantageous to provide a 6-DOF control device which more fully utilizes all the available muscle groups of the upper limb, as well the thumb and fingers, but which permits the user to communicate discrete button-pressing type information to the computer regardless of the position of the device within the user's fingers.

SUMMARY OF THE INVENTION

It is an object of the present invention to provide a six degree-of-freedom input device comprising a manipulandum which utilizes the thumb and fingers in addition to the wrist, arm and shoulders, and which permits the communicating of discrete information through squeezing of the manipulandum, regardless of the position of the user's fingers thereon.

In one aspect of the invention a six degree-of-freedom input control device comprises a substantially freely moveable housing member having a shape and dimension effective to permit a user to grasp the housing member using his fingers and manipulate the device using his limb including the fingers. The housing member includes switching means which can be actuated from substantially any position on an outer surface of the housing member.

In this aspect of the invention the housing member is substantially spherical in shape and comprises a textured outer coating adapted to prevent slipping of the housing member in the user's fingers.

In another aspect of the invention there is provided a six degree-of-freedom input control device comprising a substantially freely moveable housing member having a shape and dimension effective to permit a user to grasp the housing member using his fingers and manipulate the device using his limb including the fingers. The housing member defining an interior cavity to contain a transmitter means and the switching means which can be actuated from substantially any position on an outer surface of the housing member. The switching means being connected to the transmitter means for transmitting a switching event upon actuating the switch means.

In another aspect of the invention there is provided a human machine interactive system comprising a substantially freely moveable housing member having a shape and dimension effective to permit a user to grasp the housing member using his fingers and manipulate the device using his limb including the fingers. The housing member includes an interior cavity to contain a transmitter means and the housing member includes switching means which can be actuated from substantially any position on an outer surface of the housing member. The system includes position sensing means for sensing the position and orientation of the input device and signal processing means adapted to record a switching event when the switching means is actuated. The position sensing means is connected to the signal processing means. The system includes visual display means for displaying a visual representation of an object being manipulated by the input control device.

BRIEF DESCRIPTION OF THE DRAWINGS

The 6 DOF control device forming the present invention will now be described, by way of example only, reference being had to the accompanying drawings, in which.

DETAILED DESCRIPTION OF THE INVENTION

Figure 1:
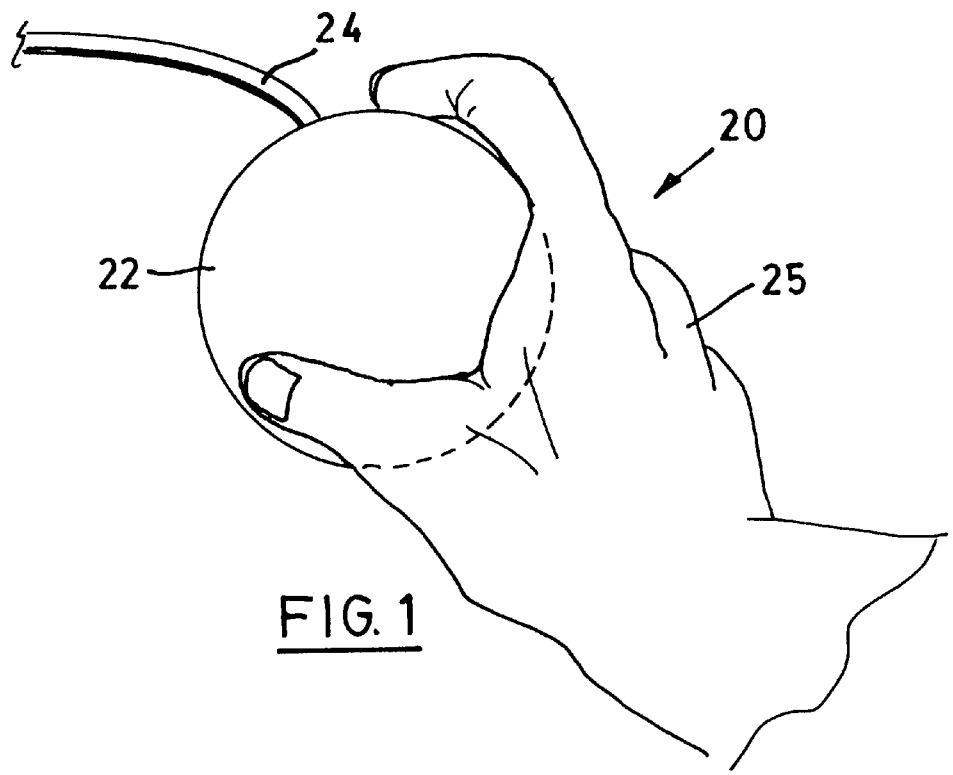
FIG. 1 is a perspective view of a 6 DOF input device constructed in accordance with the present invention.

Referring to FIG. 1 there is shown at 20 a finger operated freely moveable six degree-of-freedom (DOF) input control device constructed in accordance with the present invention. Input device 20 comprises a spherical housing 22 which is dimensioned to be readily gripped by the fingers and thumb of a user's hand 25. Housing 22 as shown is spherical in shape but it will be appreciated by those skilled in the art that it may be of any shape as long as it is adapted to be comfortably gripped by and manipulated by the user's fingers. Housing 22 is preferably provided with a rubbery or textured outer coating or surface designed to improve the user's grip in order to prevent slipping of the fingers during manipulation of the input device by the user. This easily gripped outer surface permits input device 20 to be moved with less force than would be required for a housing with a smooth, slippery outer surface and in addition it enhances cutaneous haptic feedback.

Figure 2:
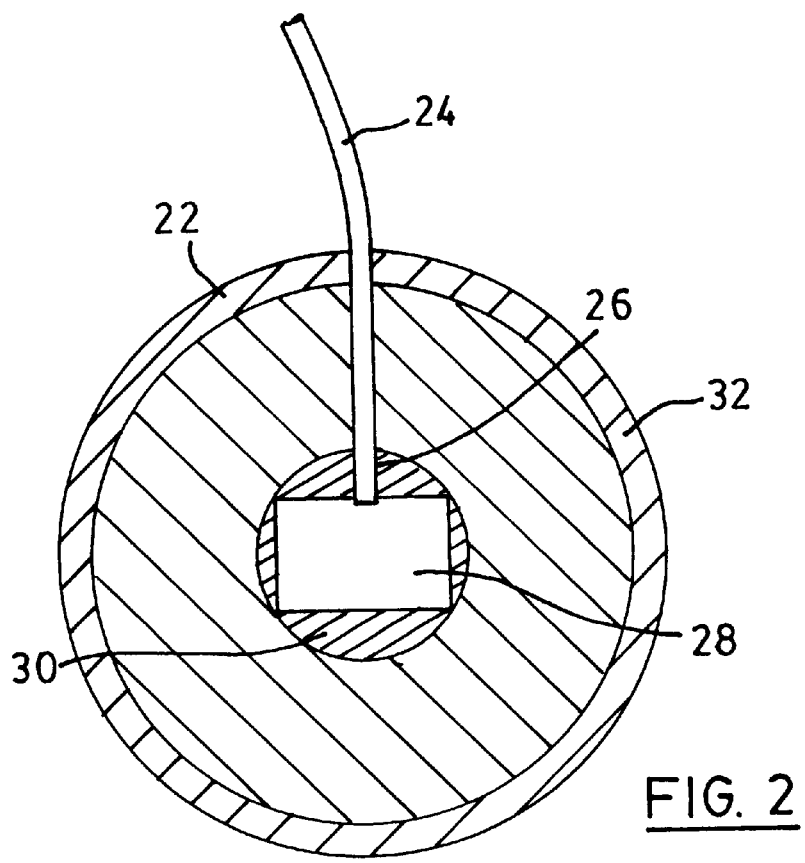
FIG. 2 is a cross sectional view of the input device of FIG. 1.

Referring to the cross sectional drawing of the input device shown in FIG. 2, housing 22 encloses a chamber or cavity 26 in which is housed a sensor 28. A receiver or sensor 28 is used for tracking of the input device and may be for example the tracker used in the Ascension Bird™. Receiver 28 is mounted in the centre of cavity 26 filled with sponge 30 and is electrically connected to the signal processor by cable 24. The electrical cord 24 of input device 20 is pointed away from the hand in the null position, so as to maximize the range of rotation without significant interference from the cord, thereby providing a substantially resistance free movement of the device by the user.

Figure 3:
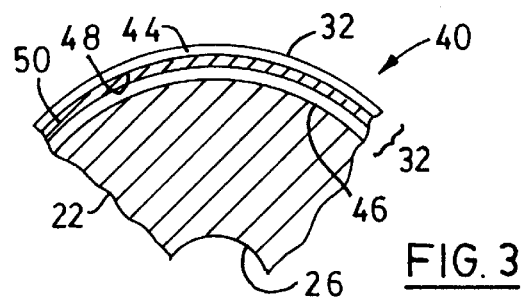
FIG. 3 is a cross sectional view, broken away, of a portion of the input device of FIG. 2 showing details of a switch mechanism forming part of the input device.

Input device 20 is constructed so that housing 22 includes a switch 32 so that the user squeezing housing 22 actuates the switch. There are several types of touch or pressure sensitive switch structures which may be incorporated into housing 22. Shown generally at 40 in FIG. 3 is a cross section, cut away, of an input device including a cross section of switch 32 functioning as the outer surface of housing 22. Switch 32 comprises an inner conductive sheet 46, an outer conductive sheet 44 and an insulating net or webbing 48 disposed between sheets 44 and 46. Webbing 48 comprises gaps 50 so that when the user squeezes input device 22 with sufficient force conductive sheets 44 and 46 are shorted together to close the circuit.

Figure 4:
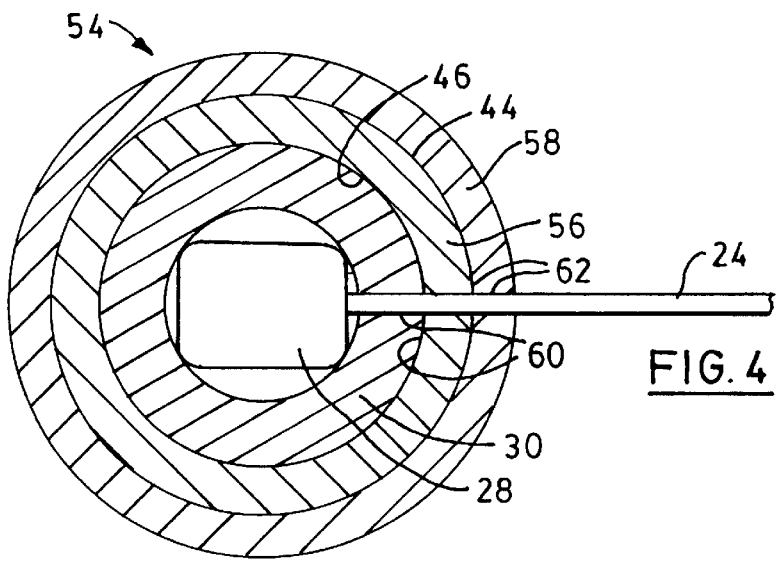
FIG. 4 is a cross sectional view of an alternative embodiment of an input device constructed in accordance with the present invention.

An alternative embodiment of an input device in accordance with the present invention is shown at 54 in FIG. 4. Input device 54 comprises a layer of elastically deformable conductive rubber layer 56 sandwiched between inner and outer electrical contact layers 46 and 44 respectively. Conductive layer 44 is connected to wire 60 and layer 46 is connected to wire 62 which are bundled with cable 24 and the wires are connected to an impedance detection circuit (not shown) located away from input device 54. An outer elastic housing or sheath 58 envelopes the conductive rubber layer 56. The impedance properties of deformable conductive layer 56 are altered when a preselected pressure is applied across any point on its surface, thereby causing an electrical change which is detected and decoded as an indication of the presence of a switching event. Such materials, known to those skilled in the art, may operate on the basis of changes in resistance, inductance or capacitance, or combinations thereof. In addition to conductive rubber, conductive and elastically deformable foam or plastic could also be used.

Figure 5:
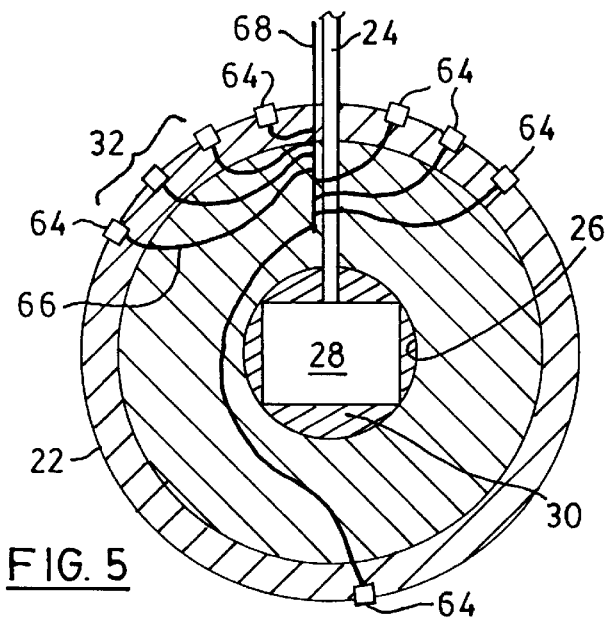
FIG. 5 is a cross sectional view of another embodiment of an input device according to the present invention utilizing piezoelectric switches located in the housing surface.

With reference to FIG. 5, another embodiment of the control unit shows switch 32 comprising a plurality of piezoelectric switches 64 incorporated into the surface of the housing 22 of the input device. Wires 66 from each piezoelectric switch 64 emerge housing 22 along a bus line 68 to the signal processor. The piezoelectric elements are positioned so the minimum spacing between each piezoelectric element is less than a finger width in order to ensure the switch is engaged by a user squeezing the input device with it in any orientation in the user's fingers.

Figure 6:
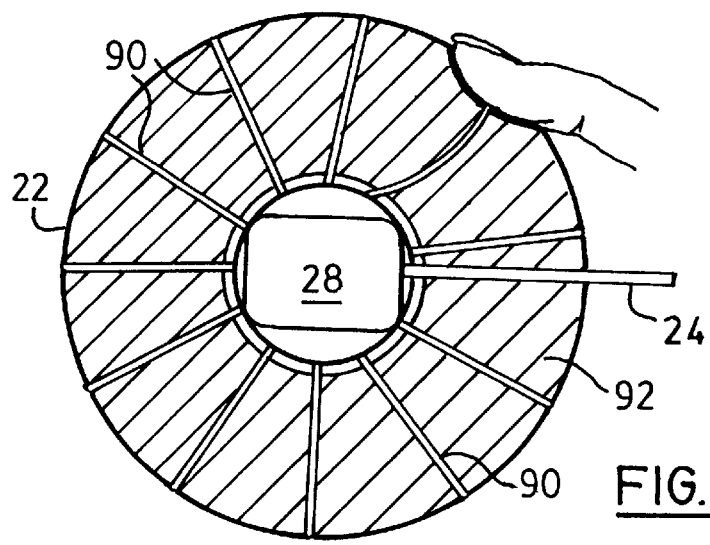
FIG. 6 is a cross sectional view of another embodiment of an input device according to the present invention utilizing fiber optic sensors.

Referring to FIG. 6, in another embodiment, a plurality of radially oriented fibre optic light filaments 90 embedded within a deformable core 92 (e.g. sponge, rubber) of housing 22 and spaced over the surface of housing 22 may also be used, whereby deformation of housing 22 causes interruption of light transmitted through the fibres, which is then decoded as an indication of the presence of a switching event.

Figure 7:
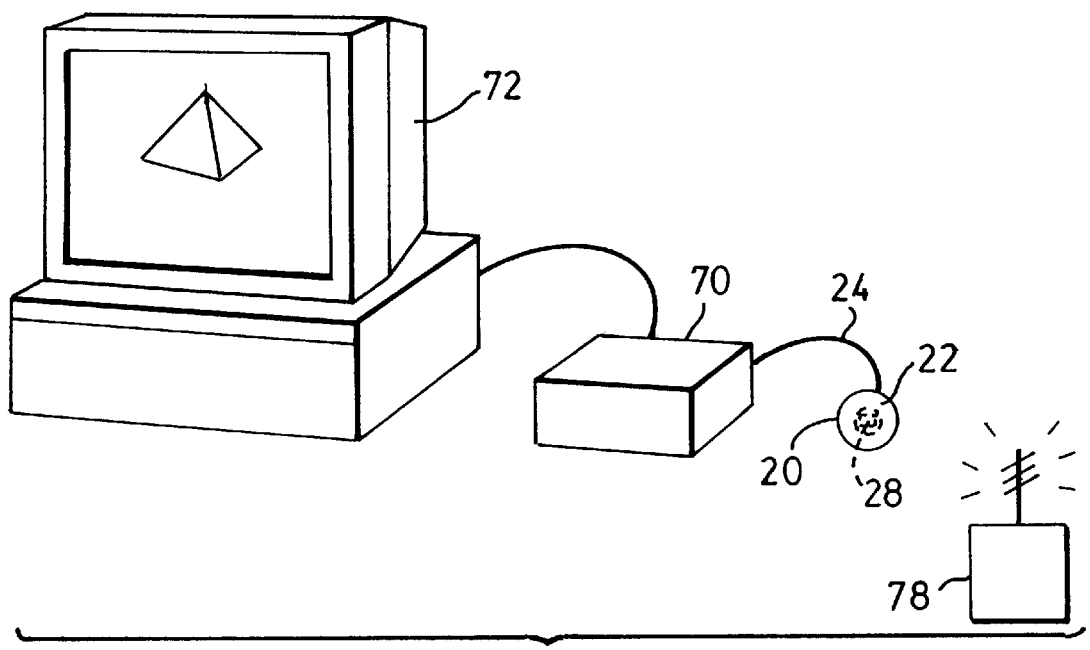
FIG. 7 is a diagrammatic representation of a human-machine interactive system utilizing the present 6 DOF input device.

Referring to FIG. 7, in operation input device 20 is wired to an electronic unit 70 which calculates the position and orientation of the 6 DOF sensor or receiver 28 located within housing 22 with respect to a transmitter 78. The sensor or receiver receives electromagnetic transmissions from the transmitter. The output of unit 70 is inputted into computer 72 which translates the position and/or velocity for the real or virtual 3D object being controlled by the input device.

The electronic processor unit 70 may be programmed to recognize various switching protocols. For example, the user could be required to activate the switch on housing 22 by multiple squeezes rather than a single application of pressure. The physical structure of the switch configurations of FIGS. 3 to 6, and other embodiments falling within the scope of the present invention may be varied to ensure a predetermined pressure must be applied before a closed contact is registered. Similarly, in addition to recognizing multiple squeezes, with an array of piezoelectric elements or with a layer of variable impedance rubber or plastic or with an array of optical fibres, unit 70 could be programmed to recognize a closed circuit only after a predetermined voltage has been generated, the voltage being proportional to the pressure applied.

There are many methods to relate motion of the input device 20 to that of an object to be manipulated. The most general procedure is as follows. A 3D cursor, of a semitransparent tetrahedron or any other shape is constantly linked to input device 20 and moves and rotates according to the position and orientation of the input device as determined by the movement of the user's limb including fingers. When the cursor is moved into an object or the space within a pre-specified radius of that object and a selection command is issued by the user activating the switch 32 whereby the object is engaged (or selected) by input device 20 and the object will follow the movement of the input device until a de-selection command is issued by the user by the user once again activating the switch. Depending on the application, there are two methods to specify the switching of the input unit. One is value-based. That is, the selection command is issued as long as the housing is squeezed to a pre-specified level. Once the pressure on the switch is released to another pre-specified level, the de-selection command is issued and the object is disengaged. The second method is togglebased, i.e. the first squeeze and release action is considered as selection and the second squeeze and release is considered de-selection.

The spherical ball shape for housing 22 shown in FIG. 2 is preferred because the symmetrical shape can easily be grasped and manipulated by the fingers in all directions. The input device is designed to be held and freely moved including translations and being rolled by the fingers, thumb, wrist, elbow and shoulder, in postures that have been classified as "precision grasp", as opposed to "power grasp". Precision grasping, while holding objects with the finger tips, places emphasis on dexterity and sensitivity. In contrast, power grasping, while holding objects against the palm, puts emphasis on security and power. The device of the present invention is provided with a versatile shape that is compatible with easy manipulation with the fingers. It is freely moveable with electrical chord 24 being the long and flexible enough that it does not present significant resistance to the movement of housing 22.

The inventors have conducted empirical studies to compare the input device of the present invention utilizing a user's fingers to manipulate the device with a glove input device (not shown) which does not utilize the fingers for 6 DOF manipulation. The inventors have observed that assignment of the muscle groups in manipulating an input device is a very critical factor determining user performance. The results show that in a 6 DOF docking task, trial completion times for the present input device that included fingers during 6 DOF manipulation were significantly shorter than those of the glove device that excluded the fingers from the 6 DOF manipulation.

The freely moveable isotonic input control device forming the subject invention is very advantageous because there is substantially no resistance to movement, translational or rotational when the user rolls the device is his or her fingers. The user may roll the input device freely between his or her fingers without interference, thereby increasing the effective range of 3 DOF rotations essentially indefinitely and greatly diminishing the need for clutching and declutching operations. Providing a "wireless" position sensor system which permits a completely tetherless input would completely eliminate any resistance due to the sensor cable 24 (FIG. 7). Such a wireless system may comprise reflectors mounted on the input unit housing adapted to reflect radar waves from a small and a compact radar transmitter or array of transmitters around the space of motion of the input device. Switching events are relayed in a wireless system using radio frequency switching technology such as used in remote control devices for security systems, to give an example. Transmitters for security locks are very small to be enclosed within the palm of the hand. In this wireless configuration a compact transmitter is mounted in the housing cavity and operably coupled to the switch on the housing actuated by the user squeezing or applying pressure to the housing as described previously.

Figure 8:
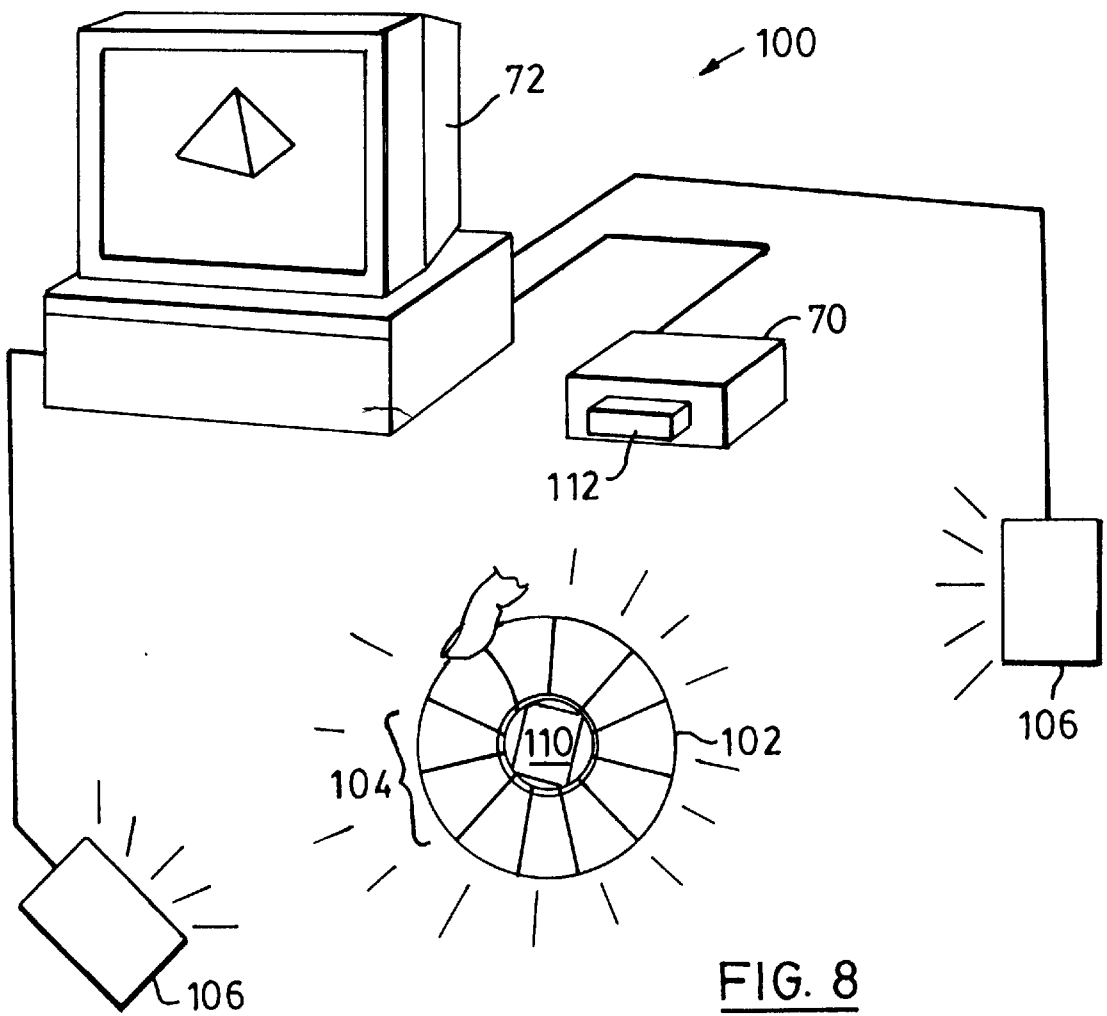
FIG. 8 is a diagrammatic representation of a human-machine interactive system utilizing the present 6 DOF input device employing wireless position sensors and switch.

Referring to FIG. 8, a wireless unit is shown at 100 with a freely moveable input unit comprising a housing 102 with a switch 104 on the housing actuated by a preselected pressure anywhere on the housing. Compact radar units 106 are spaced about the space in which the input unit moves. Contained within housing 102 is a wireless transmitter 110 operably coupled to switch 104 and processor 70 contains a receiver 112 to pick up transmissions from the transmitter. Alternatively, housing 102 may be provided with a transmitter and receivers outside the volume in which the unit is moved to receive signals thus functioning as a position sensor.

While the finger operated freely moveable 6 DOF input device forming the present invention has been described and illustrated with respect to the various embodiments disclosed herein, it will be appreciated by those skilled in the art that numerous variations of these embodiments may be made without departing from the scope of the invention.

Therefore what is claimed is:

1. A six degree-of-freedom input control device, comprising:

a substantially freely moveable housing member having a substantially spherical shape and being of a dimension effective to permit a user to grasp said housing member using his fingers and manipulate said device using his limb including the fingers;

said housing member including switching means which can be actuated from substantially any position on an outer surface of said housing member, said housing member defining an interior cavity to contain a sensor means forming part of a position detector means for determining position and orientation of said housing member, said switching means including an inner conductive sheet, an outer elastic, conductive sheet enveloping said inner conductive sheet and a net interposed between said inner and outer sheets for spacing said inner and outer conductive sheets apart, and electrical contacts applied to said inner and outer conductive sheets, whereby said switching means is actuated by a user squeezing said housing member to compress a portion of said outer conductive sheet through said net to contact a portion of said inner conductive sheet.

2. A six degree-of-freedom input control device, comprising:

a substantially freely moveable housing member having a substantially spherical shape and being of a dimension effective to permit a user to grasp said housing member using his fingers and manipulate said device using his limb including the fingers;

said housing member including switching means which can be actuated from substantially any position on an outer surface of said housing member, said housing member defining an interior cavity to contain a sensor means forming part of a position detector means for determining position and orientation of said housing member, said switching means including a layer of elastically deformable conductive foam, plastic or rubber sheet enveloping said housing member, electrical contacts applied to inner and outer faces of said conductive sheet, where electrical impedance of said conductive sheet is sensitive to external pressure applied across a width of said conductive sheet, whereby said switching means is actuated by electrical signal arising from a user squeezing said housing member to compress a portion of said conductive sheet.

3. A six degree-of-freedom input control device, comprising:

a substantially freely moveable housing member having a substantially spherical shape and being of a dimension effective to permit a user to grasp said housing member using his fingers and manipulate said device using his limb including the fingers;

said housing member including switching means which can be actuated from substantially any position on an outer surface of said housing member, said housing member defining an interior cavity to contain a sensor means forming part of a position detector means for determining position and orientation of said housing member, said switching means including a plurality of piezoelectric switches disposed globally over an accessible portion of said outer surface of said housing member, said piezoelectric switches being responsive to pressure applied by the user's fingers.

4. A six degree-of-freedom input control device, comprising:

a substantially freely moveable housing member having a substantially spherical shape and being of a dimension effective to permit a user to grasp said housing member using his fingers and manipulate said device using his limb including the fingers;

said housing member including switching means which can be actuated from substantially any position on an outer surface of said housing member, said housing member defining an interior cavity to contain a sensor means forming part of a position detector means for determining position and orientation of said housing member, said switching means including a plurality of optical light fibres radially disposed globally over an accessible portion of said outer surface of said housing member, said optical light fibres being responsive to deformations due to a preselected pressure applied by the user's fingers, said preselected pressure being effective to cause a shape of said radially oriented fibres to deform, causing interruption of light transmitted through said fibres, and means to decode said interruption of light transmission to indicate presence of a switching event.

5. A six degree-of-freedom input control device, comprising:

a substantially freely moveable housing member having a shape and dimension effective to permit a user to grasp said housing member using his fingers and manipulate said device using his limb including the fingers, said housing member defining an interior cavity to contain a sensor means forming part of a position detector means for determining position and orientation of said housing member; and said housing member including switching means which can be actuated from substantially any position on an outer surface of said housing member, said switching means including at least an inner conductive sheet, an outer elastic, conductive sheet enveloping said inner conductive sheet and a net interposed between said inner and outer sheets for spacing said inner and outer conductive sheets apart, and electrical contacts applied to said inner and outer conductive sheets, whereby said switching means is actuated by a user squeezing said housing member to compress a portion of the outer conductive sheet through the net to contact a portion of the inner conductive sheet.

6. The device according to claim 5 wherein the housing member is substantially spherical in shape.

7. The device according to claim 6 wherein said housing member comprises a textured coating adapted to prevent slipping of said housing member in the user's fingers.

8. A six degree-of-freedom input control device, comprising:

a substantially freely moveable housing member having a shape and dimension effective to permit a user to grasp said housing member using his fingers and manipulate said device using his limb including the fingers, said housing member defining an interior cavity to contain a sensor means forming part of a position detector means for determining position and orientation of said housing member; and said housing member including switching means which can be actuated from substantially any position on an outer surface of said housing member, said switching means including at least a layer of elastically deformable conductive foam, plastic or rubber enveloping said housing member, including electrical contacts applied to inner and outer faces of said conductive sheet, where electrical impedance of said conductive sheet is sensitive to external pressure applied across the width of said sheet, whereby said switching means is actuated by electrical signal arising from a user squeezing said housing member to compress a portion of the conductive sheet.

9. The device according to claim 8 wherein the housing member is substantially spherical in shape.

10. The device according to claim 9 wherein said housing member comprises a textured coating adapted to prevent slipping of said housing member in the user's fingers.

11. A six degree-of-freedom input control device, comprising:

a substantially freely moveable housing member having a shape and dimension effective to permit a user to grasp said housing member using his fingers and manipulate said device using his limb including the fingers, said housing member defining an interior cavity to contain a sensor means forming part of a position detector means for determining position and orientation of said housing member; and said housing member including switching means which can be actuated from substantially any position on an outer surface of said housing member, said switching means including at least a plurality of piezoelectric switches disposed globally over an accessible portion of said outer surface of said housing member, said piezoelectric switches being responsive to pressure applied by the user's fingers.

12. The device according to claim 11 wherein the housing member is substantially spherical in shape.

13. The device according to claim 12 wherein said housing member comprises a textured coating adapted to prevent slipping of said housing member in the user's fingers.

14. A six degree-of-freedom input control device, comprising:

a substantially freely moveable housing member having a shape and dimension effective to permit a user to grasp said housing member using his fingers and manipulate said device using his limb including the fingers, said housing member defining an interior cavity to contain a sensor means forming part of a position detector means for determining position and orientation of said housing member; and said housing member including switching means which can be actuated from substantially any position on an outer surface of said housing member, said switching means including at least a plurality of optical light fibers radially disposed globally over an accessible portion of said outer surface of said housing member, said optical light fibers being responsive to deformations due to a preselected pressure applied by the user's fingers, said preselected pressure effective to cause the shape of said radially oriented fibers to deform, causing interruption of light transmitted through the fibers, including means to decode said interruption of light transmission to indicate presence of said switching event.

15. The device according to claim 14 wherein the housing member is substantially spherical in shape.

16. The device according to claim 15 wherein said housing member comprises a textured coating adapted to prevent slipping of said housing member in the user's fingers.

* * * * *